United States Patent
Ng et al.

(10) Patent No.: US 7,777,773 B2
(45) Date of Patent: Aug. 17, 2010

(54) IMAGE QUALITY ATTRIBUTES TRACKING AND PREVENTIVE MAINTENANCE PREDICTION

(75) Inventors: Yee S. Ng, Fairport, NY (US); Eric K. Zeise, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 495 days.

(21) Appl. No.: 11/037,643

(22) Filed: Jan. 18, 2005

(65) Prior Publication Data

US 2005/0162681 A1    Jul. 28, 2005

Related U.S. Application Data

(60) Provisional application No. 60/540,133, filed on Jan. 28, 2004.

(51) Int. Cl.
    *B41J 2/47* (2006.01)
(52) U.S. Cl. .................. 347/240; 347/232; 347/5
(58) Field of Classification Search .......... 347/2, 347/3, 19, 232, 240, 5, 15
    See application file for complete search history.

(56) References Cited

U.S. PATENT DOCUMENTS

| 5,546,165 | A |   | 8/1996  | Rushing et al. ........... 355/208 |
| 5,748,221 | A | * | 5/1998  | Castelli et al. ........... 347/232 |
| 6,819,352 | B2| * | 11/2004 | Mizes et al. ............. 347/240 |

* cited by examiner

*Primary Examiner*—Lam S Nguyen
(74) *Attorney, Agent, or Firm*—Larry Kessler; Donna Suchy

(57) ABSTRACT

Image quality assessment test charts and objective image quality measurement systems may be used to evaluate the printer sub-system health before artifacts become objectionable to human observers. Diagnostic images may be printed to allow measurement of a number of system performance attributes, such as: density, banding, streak, granularity, mottle, color, gloss, gloss uniformity, edge gradient, raggedness, sharpness, background, registration, line width, and satellite measurements. By comparing these measurements to historical values or ideal values of the same measurements, preventive maintenance suggestions may be generated to avoid both unnecessary maintenance and objectionable print quality.

27 Claims, 2 Drawing Sheets

IMAGE QUALITY ATTRIBUTES TRACKING AND PREVENTIVE MAINTENANCE PREDICTION

CROSS REFERENCE TO RELATED APPLICATION

Reference is made to and priority claimed from U.S. Provisional Application Ser. No. 60/540,133, filed Jan. 28, 2004, entitled IMAGE QUALITY ATTRIBUTES TRACKING AND PREVENTIVE MAINTENANCE PREDICTION.

FIELD OF THE INVENTION

The present invention generally relates to improving the system stability of an electrophotographic system over time. More specifically, the present invention relates to using image quality assessment test charts and objective image quality measurement systems to evaluate the printer sub-system health before artifacts become objectionable to human observers.

BACKGROUND OF THE INVENTION

A conventional maintenance inspection for an electrophotographic printer has required maintenance personnel to use a manual operation and consider each component to be normal if it is currently working, except for components that may be visually inspected such as toner in a transparent plastic vessel. The maintenance personnel have considered a component to be abnormal and exchange/repair it only when it is completely inoperable or very hard to operate. In other words, the conventional maintenance inspection has judged only whether a target component is normal or abnormal, and considered the component to be normal if judging it not to be abnormal.

The conventional maintenance inspection cannot avoid considering a component to be normal, but which may not completely be normal even thought it has not reached the apparently abnormal state (referred to as "deteriorated state" hereinafter). However, the subsequent continuous use of the deteriorated state is likely to bring about a near-future failure or very poor operation. Therefore, the conventional maintenance inspection often results in inoperativeness shortly after the maintenance inspection, annoying customers. In addition, it has been disadvantageously difficult for the conventional maintenance inspection to easily judge whether a component is in the deteriorated state.

The deterioration in a printer component may disable printing in the near future as well as gradually lower the print quality. A print operation depends upon components having various print functions as a whole. One deteriorated component may lower the entire print quality. However, the conventional maintenance inspection has difficulty in quantitatively evaluating the print quality. Even a detection of the image-quality deterioration cannot easily trace the causative component.

As described in further detail in U.S. Pat. No. 5,546,165, herein incorporated in its entirety by reference, scanners and desitometers have been used to measure density and process drive of the output prints in order to improve the system stability for electrophotographic systems over time. Corrective actions may be taken based on these measurements to maintain the system tone scale. However, the measurement of these two image quality attributes may not give an accurate indication of a system problem before image quality artifact levels are objectionable to end users.

As can be seen, there is a need for the improved measurement of image quality attributes in order to monitor image quality and make the appropriate adjustments before the artifact levels become objectionable. Moreover, there is a need for the improved measurement of image quality attributes to extend the perceived useful life of components of the system and, therefore, improve the perceived reliability of the printing system.

SUMMARY OF THE INVENTION

As will be discussed in more detail below, and in accordance with the present invention, an image quality assessment test chart that contains image quality attribute measurement elements (e.g., gloss, density, banding, streaks, background, satellite, uniformity, and the like) can be used as a maintenance test chart in conjunction with objective image quality measurement systems—such as a flat-bed scanner, gloss meter (online or offline) and the like—to evaluate the printer sub-system health (before artifacts become objectionable to human observers). This evaluation allows preventive maintenance to be performed to enhance the perceived reliability of the printing system. Maintenance test charts may be printed out in printer maintenance intervals. As discussed in more detail below, the image quality measurement systems may then be used to perform objective measurements on the test chart. In many cases, objective measurement can discover problems before the artifacts caused by system degradation become objectionable to the end users. Evaluation software can be used on the scan data and suggested maintenance action can be taken by the system to perform corrective actions before the problem areas become objectionable.

The term "appearance" as used herein refers to those qualities well known in the art to those in the printing field. Such qualities include, for example, gloss, color density, banding, streaks, background, satellite, and uniformity.

The term "online" as used herein refers to a process occurring without user intervention, usually within the same apparatus as a previous process, while the term "offline" as used herein refers to a process occurring after a break in the overall process, usually requiring the user to continue the process on a different apparatus or at a different location on the same apparatus.

In one aspect of the present invention, a method for controlling the print quality of an image printed by a printing device comprises: a) printing a diagnostic image; b) measuring a plurality of image quality attributes of the diagnostic image; c) comparing the image quality attributes to at least one of a predetermined value and a historical value to determine a preventive maintenance suggestion; and d) adjusting the printing device according to the preventive maintenance suggestion, thereby controlling print quality of the image from becoming objectionable to an end user.

In another aspect of the present invention, a method for tracking image quality attributes of a printed image from a printing device and predicting a preventive maintenance schedule, comprises: a) printing a diagnostic image; b) scanning the diagnostic image to measure a plurality of measured image quality attributes; c) comparing the measured image quality attributes to a corresponding predetermined image quality attribute ideal; and d) adjusting the printing device to bring the measured image quality attributes closer to the corresponding predetermined image quality attribute ideal, thereby controlling print quality of the image from becoming objectionable to an end user.

In a further aspect of the present invention, a method for controlling the print quality of an image printed by a printing device comprises: a) printing a diagnostic image; b) scanning the diagnostic image with a flatbed scanner to measure at least one of density, banding, streak, granularity, mottle, and color; c) scanning the diagnostic image with a gloss meter to measure at least one of gloss and gloss uniformity; d) scanning the diagnostic image with an optical image analyzer to measure at least one of edge gradient, raggedness, sharpness, background, line width, registration, and satellite measurements; e) comparing at least two of the density, banding, streak, granularity, mottle, color, gloss, gloss uniformity, edge gradient, raggedness, sharpness, background, line width, registration, and satellite measurements to one of a predetermined value and a historical value to determine a preventive maintenance suggestion; and f) adjusting the printing device according to the preventive maintenance suggestion.

In yet another aspect of the present invention, an image quality attribute tracking system comprises: a scanner located along a paper path; a gloss meter located along the paper path; an optical image analyzer located along the paper path; and a controller receiving data comprising quality attributes of an image passed through the paper path.

In still a further aspect of the present invention, a printing device comprises: a printer receiving an input media and outputting an output media having an image applied thereupon; a flatbed scanner capable of measuring at least one of density, banding, streak, granularity, mottle, and color; a gloss meter is capable of measuring at least one of gloss and gloss uniformity; an optical image analyzer capable of measuring at least one of edge gradient, raggedness, sharpness, background, line width, registration, and satellite measurements; and a controller receiving data from the flatbed scanner, the gloss meter and the optical image analyzer; wherein said printer periodically produces the image as a diagnostic image having a test chart applied thereupon; wherein the test chart is passed through at least one of the flatbed scanner, the gloss meter and the optical image analyzer to obtain a plurality of image quality attributes.

In still another aspect of the present invention, a computer readable media for controlling the print quality of an image printed by a printing device comprises: a code segment for obtaining a plurality of image quality attributes of a printed diagnostic image; a code segment for comparing the plurality of the image quality attributes to one of a predetermined value and a historic value of the same image quality attribute; a code segment for determining a preventive maintenance suggestion; and a code segment for adjusting the printing device according to the preventive maintenance suggestion when the preventive maintenance suggestion may be carried out automatically.

These and other features, aspects and advantages of the present invention will become better understood with reference to the following description and claims.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
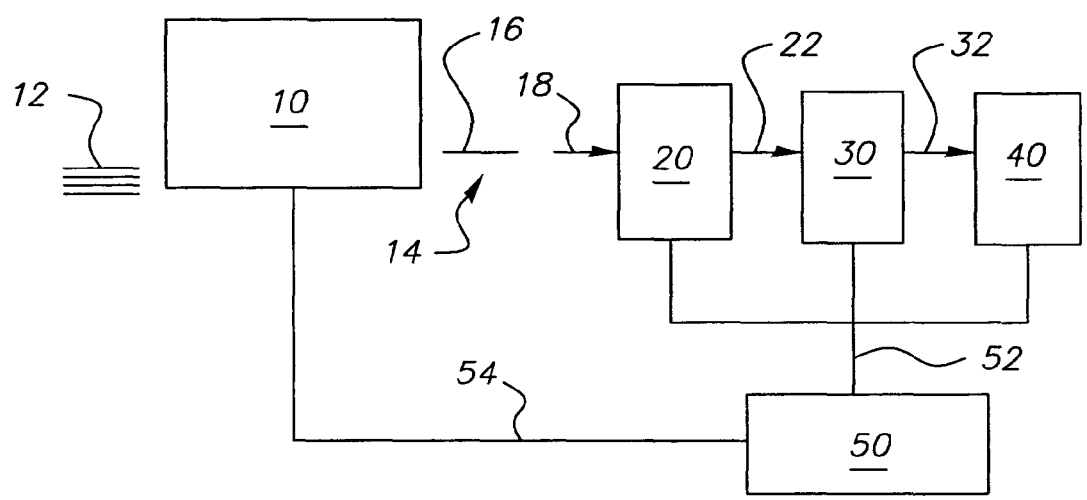
FIG. 1 is a schematic drawing showing a printing device having the image quality attributes tracking and preventive maintenance prediction function according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides for the evaluation of the system performance for electrophotographic printing systems. Diagnostic images may be printed to allow measurement of a number of system performance attributes. A scanner, for example, with appropriate evaluation methods can be utilized to measure many system performance attributes. As discussed in more detail below, these attributes may be affected in a known manner by drift or wear of components of the imaging process. Which components need adjustment or replacement can be determined by analysis of the measured system attributes and comparison of these attribute measures to predetermined system aims or to previous measurements of the same attribute (i.e., value of historical usage).

Conventional printing evaluation systems may measure, for example, density and drift. These measurements are often made after the end user detects a lower, objectionable image quality. However, there are many more image quality attributes, as discussed in further detail below, which may be periodically measured to give indication of system problems before image quality artifact levels become objectionable to the end user. In contrast, the present invention may periodically measure and analyze a plurality of system attributes, allowing for detection of gradual changes of the image quality attributes to predict failure rate and time to failure of components that cause the failure, rather than after the end user detects low image quality. These measurements may utilize a plurality of image quality measurement tools, such as a flatbed scanner, a gloss meter and an optical image analyzer. This detection ability allows for corrective maintenance actions to be suggested to the end users to extend the perceived useful life of components of the system or improved reliability of the printing system.

According to the present invention, the content of the diagnostic images and the attribute measurements available from these diagnostic images may fall into two categories. First, a minimum set of attributes and measures may be used to assess the general printing system health. These measurements are intended to ensure that problem areas can be identified. Second, specific measures of component capability may allow fine adjustment of component performance to ensure optimal system performance. Each of these attribute measurements will be discussed with more specificity in the following paragraphs and examples.

Furthermore, and according to the present invention, the analysis of the general system health attributes may enable preventative adjustment or maintenance to be identified. In general, if adjustments or maintenance is required, a more specific set of images may be printed, scanned and analyzed to determine an appropriate action. If preventative or maintenance action is deemed necessary, many of the adjustment processes can be performed autonomously by the system. In other cases, operator (or service engineer) involvement may be required as part of the required action.

The present invention may improve uptime via preventive maintenance during operation of the printer. Typically, a test chart can be run by the print engine periodically then run through instruments such as flatbed scanners (for density, banding streak, granularity, mottle and color measurements), gloss meters (for gloss and gloss uniformity measurements), and optical image analyzers (for edge gradient, raggedness, sharpness, background, line width, registration and satellite measurements). These instruments may be either online or offline. In one embodiment of the present invention, the instruments are offline, as a separate image quality attribute system station.

Referring to FIG. 1, there is shown a schematic drawing of a printing device 10 having the image quality attributes tracking and preventive maintenance prediction function according to one embodiment of the present invention. Input media 12 may be fed into printing device 10 to give an output media 14 having a test chart 16 printed thereupon. Output media 14 may then follow path 18 to be scanned by a flatbed scanner 20. Path 18 may be either an automated paper path in an online system, or a manually fed paper path in an offline system. Output media 14 may then follow path 22 to be read by a gloss meter 30. Output media 14 may then follow path 32 to be read by an optical image analyzer 40. The measurements from each of flatbed scanner 20, gloss meter 30 and optical image analyzer 40 may be fed to a controller 50 via line 52. Controller 50 may analyze the measurements and may send corrective action to printing device 10 via line 54. Controller 50 may also have attached thereto a printer (not shown) or a monitor (not shown) for providing suggestions for maintenance that may not occur through automatic adjustment of printing device 10. The analysis made by controller 50 may include, for example, comparing the measurements to past (historical) measurements (stored in, for example, a memory (not shown) of controller 50) or comparison the measurements to predetermined ideal measurements. Maintenance actions based on the analysis may then be taken, either via automatic electronic means via line 54 or manually through the user or service engineer, to restore printing device 10 to a desired quality level before artifacts become objectionable to the end user. Some examples of automatic electronic adjustments may include linearization, color density, fuser roller nip width, fuser roller temperature, and the like.

Figure 2:
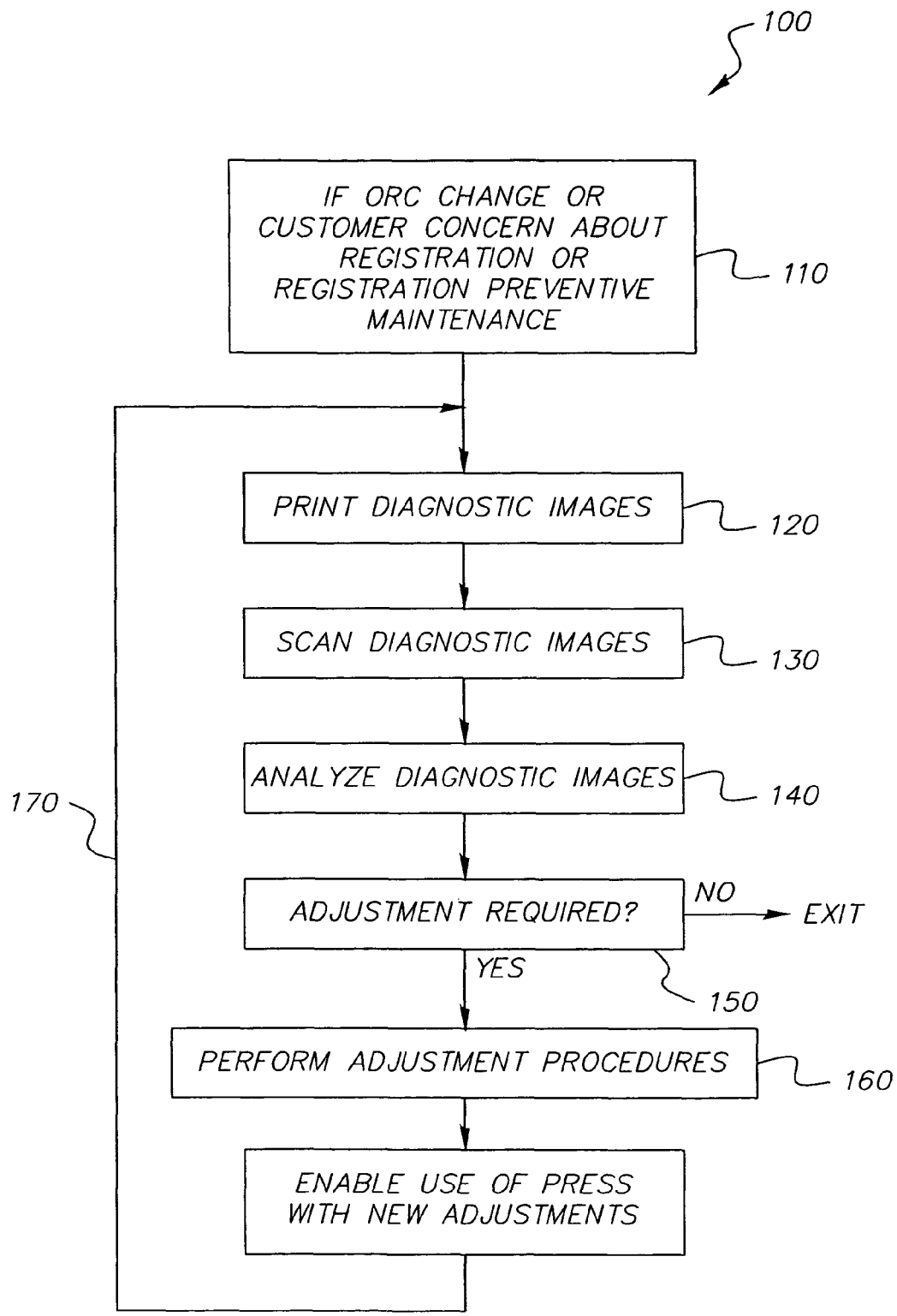
FIG. 2 is a flow chart describing a method according to one embodiment of the present invention.

Referring to FIG. 2, there is shown a flow chart corresponding to one method 100 of the present invention wherein either an operator replaceable component (ORC), such as a toner cartridge, changes, the customer is concerned about registration, or a regularly scheduled maintenance registration adjustment is due (step 110). A diagnostic image may be printed in step 120. At step 130, the diagnostic image may then be scanned by a an image quality attribute instrument— for example, a flatbed scanner 20, a gloss meter 30 and/or an optical image analyzer 40. The diagnostic images may then be analyzed in step 140 by controller 50. At decision point 150, if no adjustment is required, method 100 exits. At step 160, the adjustment procedures may be performed to enable the use of the printing device 10 with the new adjustments. If an adjustment is required, the adjustment may be made either automatically via an automatic electronic adjustment of printing device 10, or a user may be informed for the need of an adjustment. The process may be repeated, as shown by arrow 170 to verify that the adjustment made actually corrected the desired parameter.

Controller 50 may be controlled by software encoded on a computer readable media (not shown). The computer readable media may contain code segments for: (1) obtaining a plurality of image quality attributes of a printed diagnostic image; (2) comparing the plurality of the image quality attributes to one of a predetermined value or a historical value of the same image quality attribute; (3) for determining a preventive maintenance suggestion; and (4) adjusting the printing device according to the preventive maintenance suggestion when the preventive maintenance suggestion may be carried out automatically.

When performing adjustments of the image quality, the order of these adjustments, as shown in one of the image tracking/adjustment examples below, may be important, as some adjustments interact with others. The specific order may be predetermined based on any number of factors, such as the process architecture of the printer.

EXAMPLES

The following examples show how image quality attribute tracking according to the present invention may be used to suggest a particular preventive maintenance course of action. The first example also shows one instance where adjustment order is important.

In a first example, a four-color registration setup of a printer utilizing a line at a time LED writer is described. First, the upper left (UL) to lower right (LR) and the upper right (UR) to lower left (LL) diagonal differences are measured. If this measurement is out of specification, then the black writer skew may be adjusted according to any conventional skew adjustment technique. Next, the intrack image length may be measured. If this measurement is out of specification, then the intrack image length may be adjusted according to any conventional intrack image length adjustment technique. Next, if the image to paper skew or image to paper position is out of specification, then the image to paper skew and the image to paper position may be adjusted according to any conventional paper skew and image to paper position adjusting technique. Next, if the color-to-color skew is out of specification, then the color writer skew may be adjusted according to any color-to-color skew adjusting technique. Finally, if the color-to-color registration is out of specification, then the color-to-color position may be adjusted according to any conventional color-to-color position adjusting technique. Each of these measurement parameters are well known in the color printing art and may be measured by, for example, a flatbed scanner and/or an optical image analyzer.

As a second example of image attribute tracking and preventive maintenance suggestion according to the present invention, when a test chart is scanned on a flatbed scanner and density banding is detected, the banding frequency and amplitude may be identified. Specific banding frequencies, which relate to known subsystem failure modes, may be identified and corrective action may be taken. For example, a 13 Hz banding may point to development station gudgeon wear-out, a 24 Hz banding may point to tooth pitch of the development shell drive sprocket which is enhanced by contamination of the drive chain over time. When compared to previous data, one may detect a gradual degradation of the subsystem that may call for action. In some cases, maintenance, such as minor readjustment or cleaning, can restore system health and extend life of the system before end-user objectionable prints appear.

As a third example of image attribute tracking and preventive maintenance suggestion according to the present invention, fuser roller maintenance has conventionally required fuser roller replacement after a certain number of printed pages. Typically, the gloss value of printed pages may degrade due to roller surface wear and tear. Specific customer usage, either due to media roughness, coating or toner coverage, have not been conventionally taken into consideration. Thus, some customers' fuser roller may wear out faster or slower than nominal, resulting in either objectionable prints or premature change of the fuser roller. According to the present invention, a test chart with gloss patches can be printed and gloss measurement can be taken periodically with a gloss meter. If the measured gloss value is showing degradation based on historic gloss measurement data, one may be able to predict the degraded point that a roller change should occur, therefore preventing both objectionable prints and premature fuser roller change.

As a fourth example of image attribute tracking and preventive maintenance suggestion according to the present invention, a test chart with elements for measurement of background, satellite, line sharpness, raggedness, and line width may be printed and measured with an optical image analyzer. If background, satellite, and line width are all degraded (for all colors) as compared to historic data, it may point to some early failure mode of the environmental control unit. On the other hand, if only satellite and background increases for a particular color, it may point to a particular color developer's toner concentration degradation that requires attention.

As a further example of image attribute tracking and preventive maintenance suggestion according to the present invention, a test chart may be printed to analyze density patches in conjunction with a flatbed scanner. If the minimum density (Dmin) has degraded or has disappeared, it may indicate the process setup requirement of a new linearization run. The maximum density (Dmax) may also be measured and compared to historical measurement to determine the possible need for a new linearization run.

As still a further example of image attribute tracking and preventive maintenance suggestion according to the present invention, color-to-color registration test chart elements can be used in conjunction with an optical image analyzer. If color-to-color registration degradation is detected over time (but not yet to the point of customer objection), registration calibration may be done to correct the problem before it gets to an unacceptable level.

If density and gloss streaks occur, for example, via measurement by a gloss meter and a flatbed scanner, it may point to maintenance requirements in the fuser oiler. From measuring the streak frequency and streak shape (density), one can also identify whether the primary charger has been contaminated or the roller has excessive oil. A preventive cleanup of such subsystem can restore health to the printer before unacceptable prints become a problem.

Finally, as yet a further example of image attribute tracking and preventive maintenance suggestion according to the present invention, hue shift in the four-color neutral may indicate either incorrect linearization tables are being used or that a different screen set (such as line screen, which is less susceptible to registration error) should be used. The latter may especially be the case if the color-to-color registration is also degraded as compared to historical measurements.

It should be understood, of course, that the foregoing relates to exemplary embodiments of the invention and that modifications may be made without departing from the spirit and scope of the invention as set forth in the following claims.

PARTS LIST 10 printing device
12 input media
14 output media
16 test chart
18 path
20 flatbed scanner
22 path
30 gloss meter
32 path
40 optical image analyzer
42 path
50 controller
52 line
54 line
100 method according to one embodiment of the present invention
110 step of determining whether to run method
120 step of printing diagnostic image
130 step of scanning diagnostic image
140 step of analyzing diagnostic image
150 decision of determining if adjustment is required
160 step of performing adjustment procedures
170 step of repeating process to determine appropriate adjustments

The invention claimed is:

1. A method for controlling print quality of an image printed by a printing device comprising:
    a) printing a diagnostic image;
    b) measuring a plurality of image quality attributes of the diagnostic image;
    c) comparing image quality attributes, including density, banding, streak, granularity, mottle, color, gloss, gloss uniformity, edge gradient, raggedness, sharpness, background, registration, line width, and satellite measurements, to a predetermined value and historical usage values for respective same image quality attributes of the printing device to determine a preventive maintenance suggestion; and
    d) adjusting the printing device according to the preventive maintenance suggestion, thereby controlling print quality of the image before the quality becomes objectionable to an end user.

2. The method according to claim 1, wherein step d) comprises at least one of automatically adjusting the printing device and instructing a user to make a specific adjustment to the printing device.

3. The method according to claim 2, wherein step b) comprises measuring banding.

4. The method according to claim 3, wherein the preventive maintenance suggestion comprises at least one of instructing the user to replace a development station gudgeon of the printing device, instructing the user to replace a development shell drive sprocket of the printing device, and instructing the user to clean a drive chain of the printing device.

5. The method according to claim 2, wherein the preventive maintenance suggestion comprises instructing the user to replace a fuser roller of the printing device when the measurement of gloss changes, prior to a point in time when said image becomes objectionable to an end user.

6. The method according to claim 2, wherein step b) comprises measuring background, satellite, and line width.

7. The method according to claim 6, wherein the preventive maintenance suggestion comprises adjusting an environmental control unit of the printing device.

8. The method according to claim 2, wherein step b) comprises measuring satellite and background for a particular color.

9. The method according to claim 8, wherein the preventive maintenance suggestion comprises adjusting a concentration of toner of the particular color.

10. The method according to claim 2, wherein step b) comprises measuring density to determine minimum density ($D_{min}$) and maximum density ($D_{max}$).

11. The method according to claim 10, wherein the preventive maintenance suggestion comprises performing a linearization run.

12. The method according to claim 2, wherein step b) comprises measuring color-to-color registration.

13. The method according to claim 12, wherein the preventive maintenance suggestion comprises performing a registration calibration run.

14. The method according to claim 2, wherein step b) comprises measuring streaking.

15. The method according to claim 14, wherein the preventive maintenance suggestion comprises at least one of maintaining a fuser oiler of the printing device, cleaning a primary charger of the printing device, and checking the roller for excessive oil.

16. The method according to claim 2, wherein step b) comprises measuring a hue shift.

17. The method according to claim 16, wherein the preventive maintenance suggestion comprises one of using an alternate linearization table and using a different screen set.

18. The method according to claim 1, wherein step b) is carried out using at least one of a flatbed scanner, a gloss meter and an optical image analyzer.

19. The method according to claim 1, wherein step c) is carried out using a controller.

20. A method for tracking image quality attributes of a printed image from a printing device and predicting a preventive maintenance schedule, comprising:
   a) printing a diagnostic image;
   b) scanning the diagnostic image to measure a plurality of measured image quality attributes including density, banding, streak, granularity, mottle, color, gloss, gloss uniformity, edge gradient, raggedness, sharpness, background, registration, line width, and satellite measurements;
   c) comparing the measured image quality attributes to a corresponding predetermined image quality attribute ideal and to historical usage values of respective same image quality attributes of the printing device stored in a memory of a controller; and
   d) adjusting the printing device to bring the measured image quality attributes closer to the corresponding predetermined image quality attribute ideal, at a preventive maintenance schedule, thereby controlling print quality of the image before the quality becomes objectionable to an end user.

21. The method according to claim 20, wherein the plurality of measured image quality attributes includes each of density, banding, streak, granularity, mottle, color, gloss, gloss uniformity, edge gradient, raggedness, sharpness, background, registration, line width, and satellite measurements.

22. The method according to claim 20, wherein the corresponding predetermined image quality attributes are entered by a user into a memory of the controller.

23. A method for controlling the print quality of an image printed by a printing device comprising:
   a) printing a diagnostic image;
   b) scanning the diagnostic image with a flatbed scanner to measure density, banding, streak, granularity, mottle and color;
   c) scanning the diagnostic image with a gloss meter to measure gloss and gloss uniformity;
   d) scanning the diagnostic image with an optical image analyzer to measure edge gradient, raggedness, sharpness, background, line width, registration and satellite measurements;
   e) comparing a plurality of the density, banding, streak, granularity, mottle, color, gloss, gloss uniformity, edge gradient, raggedness, sharpness, background, line width, registration, and satellite measurements to a predetermined value and to a historical usage value for a respective same image quality attribute of the printing device to determine a preventive maintenance suggestion; and
   f) adjusting the printing device according to the preventive maintenance suggestion.

24. The method according to claim 23, wherein step b) is carried out offline relative to step a).

25. A printing device comprising:
   a printer receiving an input media and outputting an output media having an image applied thereupon;
   a flatbed scanner capable of measuring density, banding, streak, granularity, mottle and color;
   a gloss meter is capable of measuring gloss and gloss uniformity;
   an optical image analyzer capable of measuring edge gradient, raggedness, sharpness, background, line width, registration, and satellite measurements; and
   a controller receiving data from the flatbed scanner, the gloss meter and the optical image analyzer;
   wherein said printer periodically produces the image as a diagnostic image having a test chart applied thereupon; and
   wherein the test chart is passed through the flatbed scanner, the gloss meter and the optical image analyzer to obtain a plurality of image quality attributes, and
   wherein said controller receives the plurality of image quality attributes and compares the plurality of image quality attributes to a predetermined value and a historical usage value for a respective same image quality attribute of the printing device to determine a preventive maintenance suggestion, and, adjusts the printing device according to the preventive maintenance suggestion, thereby controlling print quality of the image from becoming objectionable to an end user.

26. The printing device according to claim 25, wherein the plurality of image quality attributes include at least two of density, banding, streak, granularity, mottle, color, gloss, gloss uniformity, edge gradient, raggedness, sharpness, background, registration, line width, and satellite measurements.

27. A computer readable media for controlling the print quality of an image printed by a printing device comprising:
   a code segment for obtaining a plurality of image quality attributes of a printed diagnostic image, wherein the plurality of image quality attributes include density, banding, streak, granularity, mottle, color, gloss, gloss uniformity, edge gradient, raggedness, sharpness, background, registration, line width, and satellite measurements;
   a code segment for comparing the plurality of the image quality attributes to one of a predetermined value and a historical usage value for a respective same image quality attribute of the printing device;
   a code segment for determining a preventive maintenance suggestion; and
   a code segment for adjusting the printing device according to the preventive maintenance suggestion when the preventive maintenance suggestion may be carried out automatically.

* * * * *